United States Patent [19]
Farrell

[11] 3,929,370
[45] Dec. 30, 1975

[54] VEHICLE-SUPPORTED STRUCTURE STABILIZER

[76] Inventor: Kenneth L. Farrell, 1719 Dundry Ave., Baldwin Park, Calif. 91706

[22] Filed: June 14, 1974

[21] Appl. No.: 479,297

[52] U.S. Cl. ........... 296/23 MC; 188/312; 267/139; 293/85; 296/35 A
[51] Int. Cl.² .......................................... B60P 3/32
[58] Field of Search........... 296/23 MC, 23 R, 35 R, 296/35 A, 35 B; 188/312, 282, 317, 321; 403/57; 267/65 A, 139; 293/70, 85

[56] References Cited
UNITED STATES PATENTS

| | | | |
|---|---|---|---|
| 1,509,381 | 9/1924 | Townsend | 403/57 |
| 1,567,517 | 12/1925 | Kisbey | 188/321 |
| 2,112,914 | 4/1938 | Leighton | 188/321 |
| 2,628,044 | 2/1953 | Johnson | 188/312 |
| 2,716,470 | 8/1955 | Focht | 188/312 |
| 3,228,632 | 1/1966 | Hunth | 188/312 |
| 3,402,961 | 9/1968 | Larson | 296/23 MC |
| 3,751,104 | 8/1973 | Thompson | 296/23 MC |

*Primary Examiner*—Robert J. Spar
*Assistant Examiner*—Gary Auton
*Attorney, Agent, or Firm*—John Holtrichter, Jr.

[57] ABSTRACT

A hydraulic stabilizer for damping vibrations between a vehicle and a structure carried thereby such as a camper, for example, the stabilizer including an inextensible elongated body member having an elongated cylindrical fluid chamber adjacent an end of the body member attached to one of two brackets respectively attached to the vehicle and to the structure, a piston supported in the fluid filled chamber includes at least one restricted orifice and an inextensible elongated piston rod arrangement extends from opposite sides of the piston always through fluid-type packing arrangements at the ends of the fluid chamber, one end of which rod attaches to the other of the brackets whereby reciprocal piston movement in the fluid chamber dampens vibrations, the length of the fluid chamber being substantially greater than the normal maximum reciprocal excursion of the piston to accommodate installations having different bracket-to-bracket distances, without using adjustable length members.

4 Claims, 9 Drawing Figures

U.S. Patent  Dec. 30, 1975  3,929,370
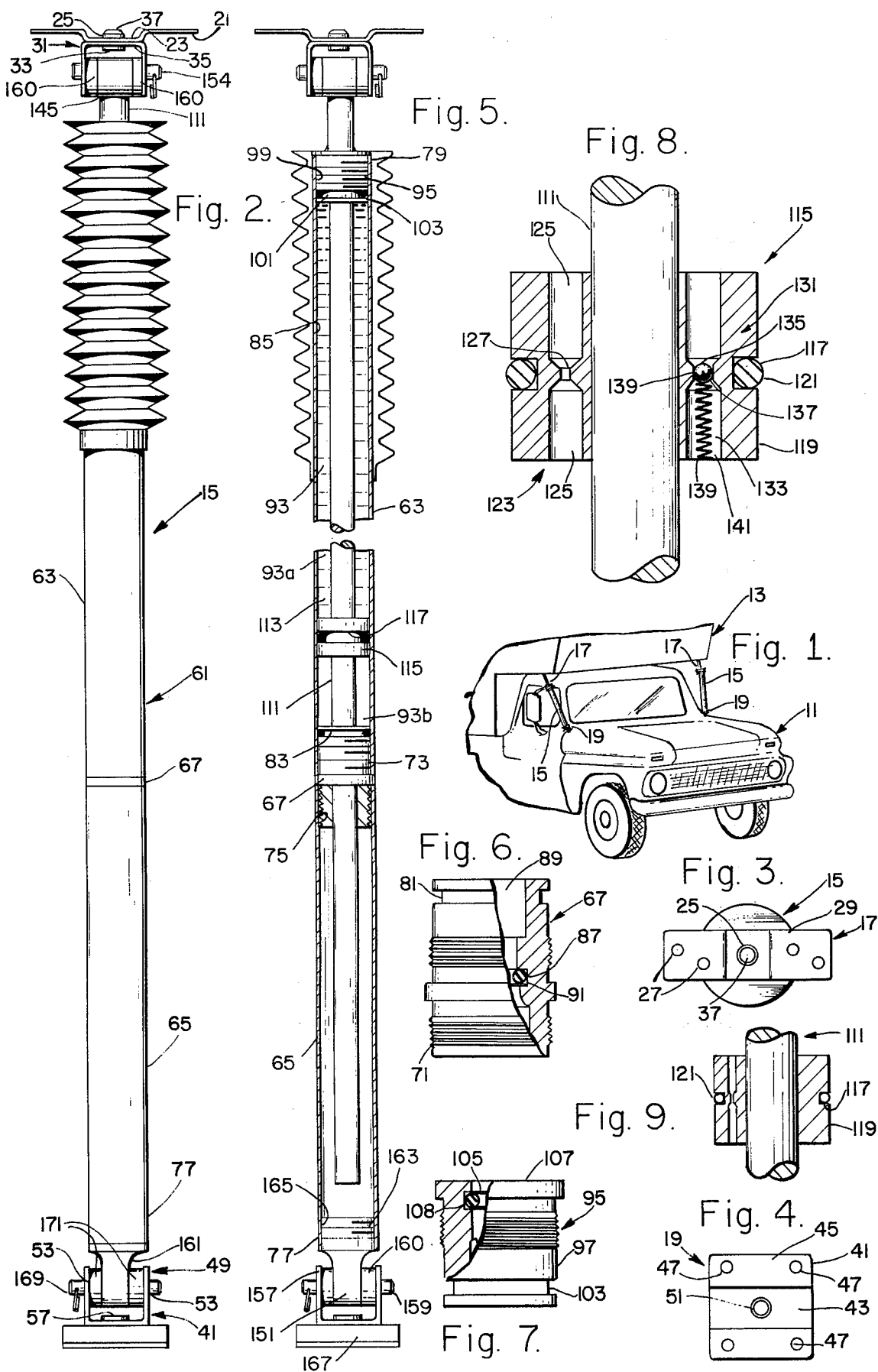

VEHICLE-SUPPORTED STRUCTURE STABILIZER

BACKGROUND OF THE INVENTION

The background of the invention will be set forth in two parts.

1. Field of the Invention

The present invention pertains generally to the field of hydraulic stabilizers and more particularly to a hydraulic stabilizing device adaptable to a wide variety of installations wherein structures such as camper bodies are carried by vehicles, for example.

2. Description of the Prior Art

In recent years, the use of camper and other recreational structures on motorized vehicles has grown tremendously. Along with this growth there have been found to be a number of serious problems involving the joining of these two relatively heavy bodies where the vehicle is to travel on all possible imagined road and off-road conditions.

In most earlier installations, it was the practice to simply bolt one body to the other or to use turnbuckles and the like to assure that there would be no separation. It was not long before complaints of attachment failure and undesired vibration were dealt with by the replacement of at least some of the unyielding attachment arrangements by hydraulic stabilizers. This technique significantly reduced the transfer of vibration from the moving vehicle to the camper body and also reduced other undesirable characteristics of the previous attachment schemes, such as sway and bounce.

For years, the hydraulic devices used in this application were fabricated from standard, commercially available automobile shock absorbers. In order to adapt a standard shock absorber to camper stabilization use, axial extension arms were generally welded to at least one end of a shock absorber and the assembly was then supported between a camper-mounted bracket and a bracket fixedly attached to the vehicle. It was immediately realized however that the distance between the brackets varied considerably with nearly every installation and that some means would have to be provided in order to adapt a single commercially made stabilizer to varying support parameters.

Accordingly, it has become common practice to provide in an elongated extension arm of a conventional shock absorber, a telescoping or otherwise adjustable length arrangement to compensate for the wide variety of mounting conditions found in the field. This arrangement for adjustable linkage is the direct result of using standard-type shock absorbers which are designed to operate with relatively short reciprocal excursions of its two major component parts.

In contrast to the prior art, the present invention utilizes a unique hydraulic system that allows relatively great lineal distance changes between its major components without changing its characteristics and thus obviates the requirement of adjustable linkage mechanisms for mounting the device to a wide variety of vehicle-camper arrangements and the like.

SUMMARY OF THE INVENTION

In view of the foregoing factors and conditions characteristic of the prior art, it is a primary object of the present invention to provide a new and improved stabilizing device for use with a vehicle and a structure supported on the vehicle.

Another object of the present invention is to provide a simple yet effective and efficient hydraulic stabilizing device that does not utilize a mechanical linkage adjustment arrangement in order to accommodate a wide variety of installations.

Still another object of the present invention is to provide a stabilizing device for use in combination with a vehicle and a structure supported on the vehicle, the device including a hydraulic system having a programmed response to force loads.

Another object of the present invention is to provide a hydraulic stabilizer for mounting to brackets affixed respectively to a vehicle and a structure supported thereby, the brackets being exceptionally strong while allowing a wide variety of mounting orientations.

In accordance with an embodiment of the present invention, at least one stabilizing device extends between a vehicle and a structure supported on the vehicle for minimizing the vibration of the structure and relative movement between the vehicle and the structure when in motion. The stabilizing device includes brackets fixedly attached respectively to the structure and the vehicle. Also included is an inextensible elongated body member attached at a first of its ends to one of the brackets, the body member including an elongated cylindrical fluid chamber adjacent the second of the ends of the housing. A damping fluid is disposed within and completely fills the chamber, and a piston is supported in the fluid chamber to divide the chamber into two portions of reciprocally variable capacity. The piston is provided with at least one restricted orifice for restricting the flow of the damping fluid between the two portions of the fluid chamber. An inextensible elongated piston rod arrangement extends from opposite sides of the piston and always extends through fluid-tight packing arrangements at opposite ends of the fluid chamber. A first end of the piston rod arrangement extends beyond the second end of the body member and is attached to the other of the brackets whereby relative movement of the structure and the vehicle causes a directly related reciprocal excursion of the piston in the fluid chamber, the length of the fluid chamber being substantially greater than the normally maximum reciprocal excursion of the piston.

The features of the present invention which are believed to be novel are set forth with particularity in the appended claims. The present invention, both as to its organization and manner of operation, together with further objects and advantages thereof, may best be understood by making reference to the following drawing, in which like reference characters refer to like elements and components in the several views.

BRIEF DESCRIPTION OF THE DRAWING

FIG. 1 is a perspective view of a stabilizer device in accordance with the present invention mounted between a vehicle and a structure supported thereon;

FIG. 2 is an elevational view of a stabilizer of the type shown in FIG. 1;

FIG. 3 is a top view of the device of FIG. 2;

FIG. 4 is a bottom view of the device of FIG. 2;

FIG. 5 is a sectional view of the stabilizer of FIG. 2 taken along line 5—5;

FIG. 6 is a partial sectional view of a coupling member used in the device of FIG. 2;

FIG. 7 is a view of an end fitting, partially in section, used in the device of FIG. 2;

FIG. 8 is a sectional view of a piston in accordance with one embodiment of the invention as it is fixedly mounted on a piston rod arrangement in the device of FIG. 2; and FIG. 9 is a sectional view of a piston in accordance with another embodiment of the invention.

DESCRIPTION OF THE PREFERRED EMBODIMENT

Referring now to the drawing and more particularly to FIGS. 1 and 2, there is shown a vehicle 11 supporting a structure 13 and a pair of stabilizing devices 15 extending between the structure 13 and the vehicle 11 for minimizing the vibration of the structure and movement of the structure 13 relative to the vehicle 11 when the same are in motion.

Each of the devices 15 is supported between a pair of brackets 17 and 19, respectively, fixedly bolted, screwed or otherwise attached to the vehicle 11 and structure 13. The bracket 17, also shown in FIG. 3, includes a base structure 21 having a planar plateau portion 23 with a hole 25 disposed symmetrically therein, and having mounting holes 27 disposed in the opposite flange portions 29 thereof. The bracket 17 further includes a U-shaped structure 31 with a hole 33 in its base portion 35 through which a rivet 37 or other appropriate element extends. The rivet 37 also extends through the hole 25 where it is permanently fastened by appropriate means to act as a pivot between the base and the U-shaped structures 21 and 31, respectively.

The bracket 19 may be of a configuration similar to or exactly like the bracket 17, or it may preferably have a large area base structure 41, as best viewed in FIG. 4. The structure 41 includes an elongated raised plateau portion 43 and a pair of opposite flange portions 45 with mounting holes 47 therein. A U-shaped structure 49, similar to structure 31, is pivotally attached to the base structure 41 by means of a rivet 51 extending through respective holes 53 and 55 in the base and U-shaped structures 41 and 49.

As best illustrated in FIGS. 2, 5 and 6, the stabilizing device 15 includes an inextensible elongated tubular body member 61, which in the presently preferred embodiment of the invention comprises a chamber portion 63 and a skirt portion 65. These two portions are fixedly held in axial alignment by a coupling member 67 having appropriately threaded ends 69 and 71 threadably engaging respective inner threaded end walls 73 and 75. The chamber and skirt portions and the coupling member are preferably fabricated from a strong but lightweight metal such as an aluminum alloy, for example, but other suitable material such as steel, brass, etc., may be used. It should also be understood that other constructions may be utilized in fabricating the inextensible elongated tubular body member 61. This member, however, must be inextensible in length between a first of its ends 77 and a second end 79.

FIGS. 5 and 6 also illustrate that the coupling member 67 includes an exterior circular groove 81 adjacent its threaded end 69 to seat a conventional resilient O-ring seal element 83 therein. This configuration provides a fluid-tight seal between the interior wall 85 of the chamber portion 63 and the exterior of the coupling member 67. The coupling member is also provided with an interior circular groove 87 in an axial bore 89, the groove being adapted to seat a smaller diameter conventional O-ring seal element 91.

A fluid chamber 93 is defined in the chamber portion 63 by the interior wall 85, the coupling member 67 and an end fitting 95 having a threaded barrel portion 97 threadably engaging an appropriately threaded inner wall portion 99 of the interior wall 85 adjacent the second end 79 of the body member 61. A fluid-tight seal is provided to the exterior of the end fitting 95 by an O-ring seal element 101 disposed in an exterior circular groove 103 adjacent the end of the threaded barrel portion 97, as shown in FIG. 7, for example. This figure also shows an interior circular groove 105 adjacent the exterior end 106 of the end fitting 95 to seat an O-ring seal element 107, the function of which seal element and the seal element 91 will be described hereinafter.

Continuously disposed through the openings in the interior seal elements 91 and 107 is an axially movable inextensible elongated piston rod arrangement 111. That is, the rod arrangement 111, as a unit, is movable along the longitudinal axis of the body member 61 but is itself not extensible in length. With the rod arrangement 111 so positioned, it can be seen that a hydraulic type fluid, such as damping fluid 113, disposed in the fluid chamber 93 will not be able to flow from the chamber 93 even when the rod arrangement 111 is moved axially.

As best illustrated in FIGS. 5 and 8, a piston 115 is fixedly mounted on the rod arrangement 111 in the fluid chamber 93 to effectively divide this chamber into two portions 93a and 93b of reciprocally variable capacity, the piston being fixedly located on the arrangement 111 to be adjacent the coupling member 67 at the maximum possible inward excursion of the rod arrangement and to be adjacent the end fitting 95 at the maximum possible outward excursion of the rod arrangement 111. The piston 115 may be attached to the rod arrangement by any conventional means such as set screws or a press fit between these two components, for example. The piston 115 includes a circular groove 117 in its outer cylindrical wall 119 that conforms to the shape of the interior wall 85, and an O-ring seal element 121 is disposed in the groove 117 and is in sliding sealing contact with the interior wall 85 to prevent the fluid 113 from flowing around the piston 115 from one chamber portion to the other.

The piston 115 includes at least one restricted orifice 123 restricting the flow of the damping fluid 113 between the aforementioned chamber portions through the piston. In an embodiment of the invention wherein the piston 115 has a single restricted flow orifice, shown in FIG. 9, the orifice includes two opposite inwardly extending and axially aligned bore portions 125 and a reduced diameter portion 127 intermediate the side walls of the piston. However, in the presently preferred embodiment of the invention the piston also includes a pressure-actuated second restricted flow orifice 131, as illustrated in FIG. 8. The orifice 131 includes a pair of opposite inwardly extending and axially aligned bore portions 133 and a reduced diameter bore portion 135 intermediate the outer extremities of the bore portions 133. Movable mounted within the reduced diameter bore portion 135 is a close fitting spherical valve member 137 normally supported in its seat 138 intermediate the outer extremities of the reduced diameter bore portion 135 by a pair of valve springs 139, each bearing on opposite sides of the valve member 137 and anchored at their respective outer extremities or ends 141 by conventional spring retainer clips 143.

Thus, in the embodiment shown in FIGS. 8 and 9, the orifice 123 allows a restricted flow rate to occur between the two chamber portions 93a and 93b when external pressure or tension is exerted on an exterior end 145 of the rod arrangement 111 relative to the first end 77 of the body member 61. In addition to the continuously open orifice 123, the embodiment illustrated in FIG. 8 includes the second orifice 131 with its pressure actuated valve arrangement so that damping fluid flow through the reduced diameter bore portion 135 occurs only when the pressure exerted by the piston 115 on the fluid 113, and thus on the valve member 137 by the fluid, exceeds a predetermined magnitude to overcome the bias of one of the springs 139 to allow the valve member 137 to move a short distance out of its seat 138. The latter technique provides a programmable stabilizer characteristic that may be selected for differing load demands.

FIGS. 2 and 5 best illustrate the presently preferred method of attaching the ends of the stabilizing device 15 to the brackets 17 and 19. Here it can be seen that the piston rod arrangement 111 includes an end piece 151 with a transverse bore 153 for movable accepting a coupling pin 155. To pivotally attach the device 15 to the bracket 17, the piston 155 is pushed through one of a pair of axially aligned holes 157 in parallel arms 159 of the U-shaped structure 31. Also, a pair of resilient spacers 160 with reduced diameter insert portions 161 are disposed in the bore 153 and positioned between the end piece 151 and the bracket arms 159.

At the opposite end of the device 15, an end piece 161 is fixedly attached to the first end 77 of the body member 61 by means of a threaded end portion 163 threadably engaging a threaded interior wall portion 165 of the skirt portion 65. The end piece 161 is provided with a transverse bore 167 for accepting a coupling pin 169 and a pair of resilient spaces 171 that are similar to the spaces 160.

In operation, relative movement between the vehicle 11 and the structure 13 is translated in the stabilizer 15 by movement of the piston 115 in the fluid chamber 93. Thus, this relative movement (toward and away) causes a directly related reciprocal excursion of the piston in the fluid chamber, and, at least as to rapid changes, is dampened more smoothly by the fluid flow rate restriction of the damping fluid through one or more of the orifices in the piston.

The normal total reciprocal excursion distance of the piston 115 in the chamber 93 is about one-half inch or less and in accordance with the present invention, this total reciprocal excursion distance is substantially smaller than the length of the fluid chamber 93. This relationship is a key feature in the invention because it allows for the use of the same size stabilizing device 15 in installations having greatly varying distances between the brackets 17 and 19, without the use of extensible members which are generally a point of weakness and often do not retain their desired adjusted length.

In a stabilizing device presently produced, the fluid chamber length is about 9¾ inches, the skirt 65 length is about 9 inches, and the length of the 1 inch diameter piston is about three-fourths inch. The overall length of the tubular body member 61 is about 20½ inches and the external end of the piston rod arrangement 111 extends beyond the second end of the body member by about 2 inches, in the latter's designed maximum inward operational excursion. In this configuration, the same size stabilizing device will accommodate installations varying in bracket separations of up to 9 inches without the use of any extensible elements.

Other features of the invention to be specifically recognized are that the diameter of the piston rod arrangement is the same on both sides of the piston and the piston rod arrangement always extends completely through the fluid chamber so that the fluid in each of the chamber portions 93a and 93b are always directly reciprocal.

What is claimed is:

1. In combination with a vehicle, a removable body structure supported on said vehicle, at least one stabilizing device extending between said structure and said vehicle for minimizing the vibration of said structure and movement of said structure relative to said vehicle when the same are in motion, said stabilizing device including:

brackets fixedly attached respectively to said structure and to said vehicle;

an inextensible elongated body member attached at a first of its ends to one of said brackets, said body member including an elongated cylindrical fluid chamber adjacent the second of said ends of said housing;

a damping fluid disposed within and completely filling said fluid chamber;

a piston supported in said fluid chamber dividing said fluid chamber into two portions of reciprocally variable capacity, said piston including at least one restricted orifice restricting the flow of said damping fluid between said two portions of said fluid chamber;

an inextensible elongated piston rod arrangement extending from opposite sides of said piston and always through said fluid-tight packing arrangements at opposite ends of said fluid chamber, a first end of said piston rod arrangement extending beyond said second end of said body member and attached to the other of said brackets and a second end of said piston rod arrangement always being disposed completely within said body member whereby relative movement of said structure and said vehicle causes a directly related reciprocal excursion of said piston in said fluid chamber, the length of said fluid chamber being substantially greater than the normal maximum reciprocal excursion of said piston, wherein each of said brackets include a body portion with attachment holes and also include a U-shaped bracket pivotally mounted on said body portion, said bracket including aligned transverse holes in the arms of said bracket, and wherein said first ends of said inextensible elongated body member and said inextensible elongated piston rod arrangement include a transverse hole and a removable pin normally disposed through associated ones of said transverse holes.

2. The stabilizing device according to claim 1, wherein said piston includes a circular groove about its outer cylindrical periphery, said stabilizing device also including an O-ring seal partially disposed in said groove and in constant sliding fluid-sealing engagement with the inner wall of said fluid chamber.

3. The stabilizing device according to claim 1, wherein said restricted orifice includes two opposite, inwardly extending and axially aligned bore portions and a reduced diameter portion between and communicating simultaneously with the bore portions.

4. The stabilizing device according to claim 3, said piston including two of said restricted orifices a second of which includes a close-fitted spherical valve member normally supported in its seat centrally within said reduced diameter portion, and also included in said second restricted orifice are a pair of matched valve springs disposed in opposite ones of said bore portions and in contact with opposite sides of said spherical valve member, said valve springs being anchored to said piston and normally exerting equal and opposite bias forces on said spherical valve member which may be overcome by a predetermined differential pressure of said damping fluid on one side of said valve member.

* * * * *